US012650488B2

(12) United States Patent
Vejlgaard et al.

(10) Patent No.: US 12,650,488 B2
(45) Date of Patent: Jun. 9, 2026

(54) CLIENT DEVICE ORIENTATION ESTIMATION

(71) Applicant: Nokia Technologies Oy, Espoo (FI)

(72) Inventors: Benny Vejlgaard, Aalborg (DK);
Oana-Elena Barbu, Aalborg (DK);
Ryan Keating, Naperville, IL (US);
Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 265 days.

(21) Appl. No.: 18/552,604

(22) PCT Filed: Apr. 29, 2021

(86) PCT No.: PCT/EP2021/061234
§ 371 (c)(1),
(2) Date: Sep. 26, 2023

(87) PCT Pub. No.: WO2022/228677
PCT Pub. Date: Nov. 3, 2022

(65) Prior Publication Data
US 2024/0175969 A1 May 30, 2024

(51) Int. Cl.
*G01S 5/02* (2010.01)
*G01S 3/14* (2006.01)

(52) U.S. Cl.
CPC ............ *G01S 5/0247* (2013.01); *G01S 3/146* (2013.01); *G01S 5/0236* (2013.01)

(58) Field of Classification Search
None
See application file for complete search history.

(56) References Cited

U.S. PATENT DOCUMENTS

| | | | |
|---|---|---|---|
| 10,687,303 | B2 | 6/2020 | Kurras et al. |
| 10,892,832 | B2 | 1/2021 | Young et al. |
| 2012/0162012 | A1 | 6/2012 | Marzouki et al. |
| 2016/0047885 | A1 | 2/2016 | Wang et al. |
| 2020/0229010 | A1 | 7/2020 | Soriaga et al. |
| 2020/0267681 | A1 | 8/2020 | Ferrari et al. |

(Continued)

FOREIGN PATENT DOCUMENTS

| | | |
|---|---|---|
| EP | 2422210 B1 | 9/2013 |
| WO | 2006/007840 A1 | 1/2006 |
| WO | 2010/122370 A1 | 10/2010 |

OTHER PUBLICATIONS

"3rd Generation Partnership Project; Technical Specification Group Radio Access Network; NR; Physical layer procedures for data (Release 16)", 3GPP TS 38.214, V16.4.0, Dec. 2020, pp. 1-169.

(Continued)

*Primary Examiner* — Whitney Moore

(74) *Attorney, Agent, or Firm* — Lippes Mathais LLP

(57) ABSTRACT

According to an example embodiment, a client device is configured to receive a first positioning reference signal; identify an orientation of a polarisation of the first positioning reference signal based on the received first positioning reference signal; estimate an orientation of the client device based on at least the identified orientation of the polarisation of the first positioning reference signal; and provide the orientation estimate to a network node device, Devices, methods, and computer programs are disclosed.

16 Claims, 7 Drawing Sheets

(56) References Cited

U.S. PATENT DOCUMENTS

| | | | | |
|---|---|---|---|---|
| 2022/0065978 | A1* | 3/2022 | Manolakos | G01S 5/0236 |
| 2024/0414684 | A1* | 12/2024 | Singh | G01S 5/0247 |

OTHER PUBLICATIONS

"3rd Generation Partnership Project; Technical Specification Group Radio Access Network; LTE Positioning Protocol (LPP) (Release 16)", 3GPP TS 37.355 V16.3.0, Dec. 2020, pp. 1-298.

"New WID on NR Positioning Enhancements", 3GPP TSG RAN Meeting #90e, RP-202900, Agenda: 9.1.1, CATT, Dec. 7-11, 2020, 5 pages.

"3rd Generation Partnership Project; Technical Specification Group Services and System Aspects; Service requirements for the 5G system; Stage 1 (Release 18)", 3GPP TS 22.261, V18.1.1, Jan. 2021, 85 pages.

Talvitie et al., "Novel Algorithms for High-Accuracy Joint Position and Orientation Estimation in 5G mmWave Systems", IEEE Globecom Workshops (GC Wkshps), Dec. 4-8, 2017, 7 pages.

Mendrzik et al., "Joint Localization and Mapping Through Milli-meter Wave MIMO in 5G Systems", arXiv, Aug. 2, 2018, 14 pages.

Talvitie et al., "High-Accuracy Joint Position and Orientation Estimation in Sparse 5G mmWave Channel", IEEE International Conference on Communications (ICC), May 20-24, 2019, 7 pages.

"Higher layer support of Reduced Capability NR Devices", 3GPP TSG-RAN WG1 Meeting #104-e, R1-2100500, Agenda: 8.6.2, Nokia, Jan. 25-Feb. 5, 2021, 12 pages.

Zhang et al., "NLOS Signal Detection Based on Single Orthogonal Dual-Polarized GNSS Antenna", Hindawi, International Journal of Antennas and Propagation, vol. 2017, Apr. 13, 2017, pp. 1-10.

"FL Summary #5 for Potential Positioning Enhancements", 3GPP TSG RAN WG1 Meeting #103-e, R1-2009397, Agenda: 8.5.3, CATT, Oct. 26-Nov. 13, 2020, 106 pages.

Garcia et al., "Fifth Generation Communication Automotive Research and innovation Deliverable D3.2 Report on Channel Modelling and Positioning for 5G V2X", 5GCAR/D3.2, v1.0, Nov. 30, 2018, pp. 1-91.

International Search Report and Written Opinion received for corresponding Patent Cooperation Treaty Application No. PCT/EP2021/061234, dated Jan. 20, 2022, 11 pages.

* cited by examiner

100

200

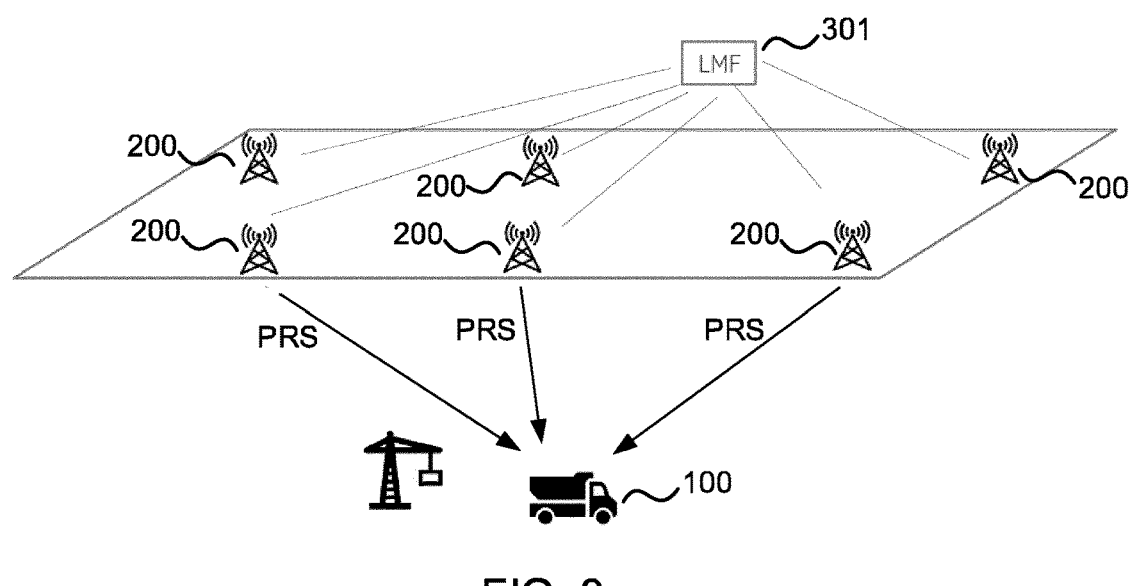
FIG. 3
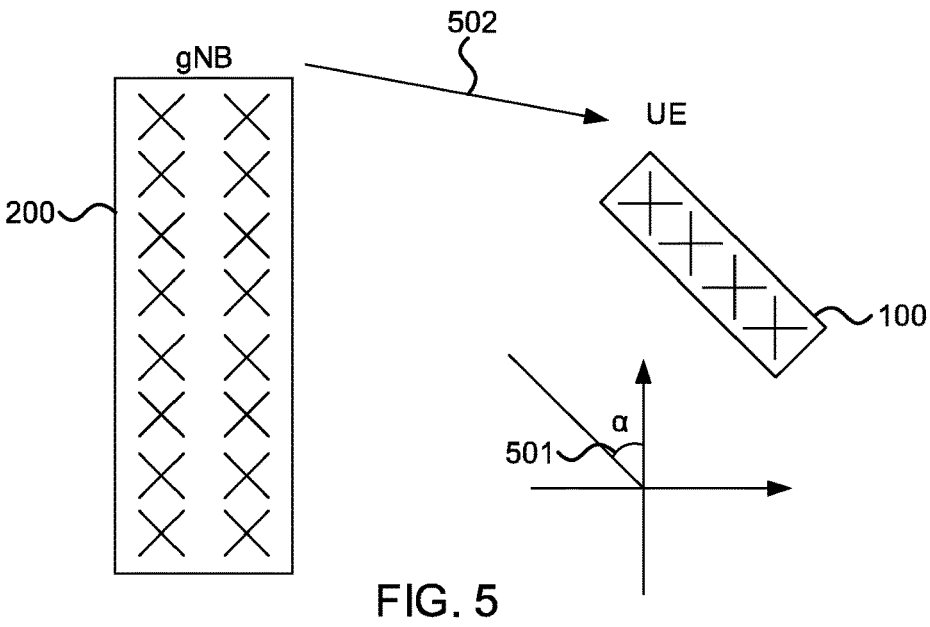
FIG. 4
FIG. 5

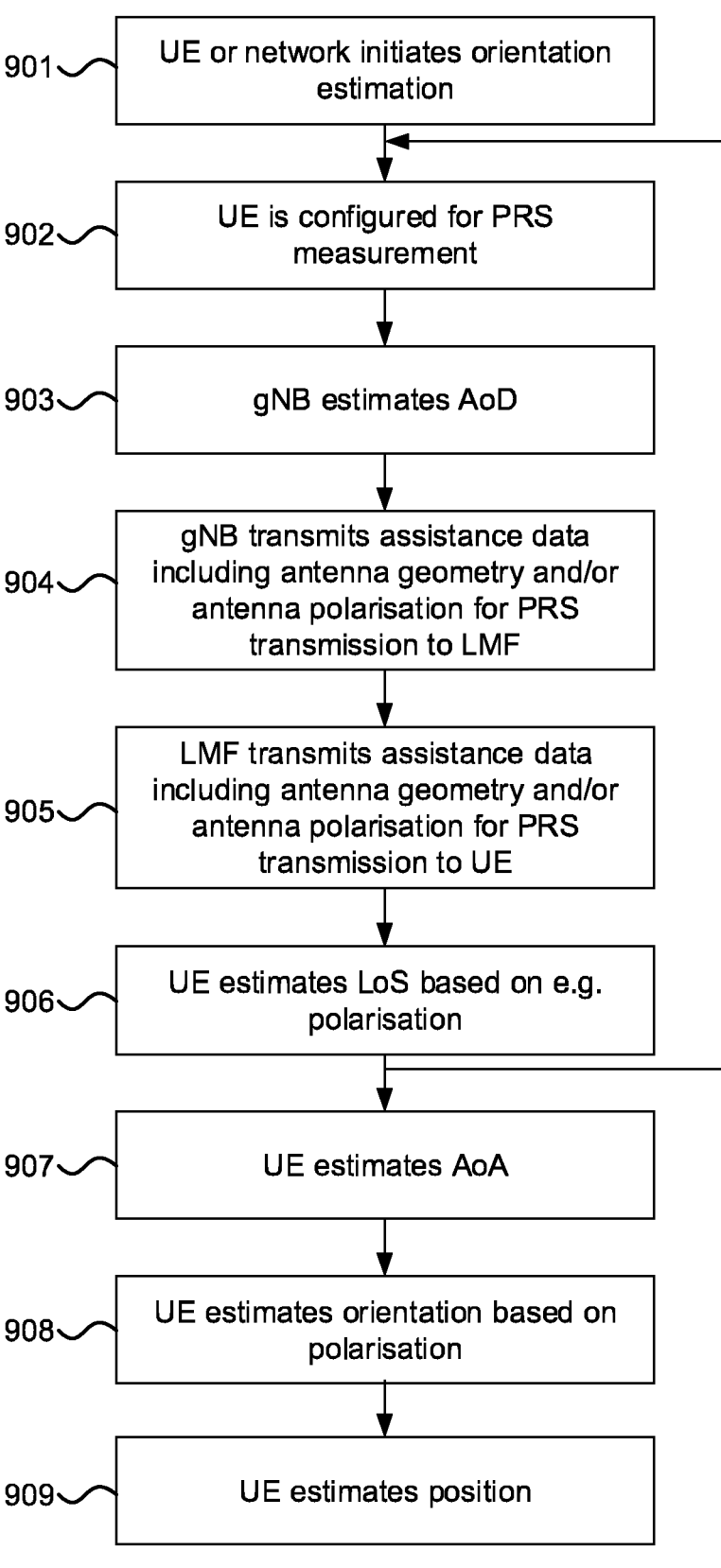

901 — UE or network initiates orientation estimation

902 — UE is configured for PRS measurement

903 — gNB estimates AoD

904 — gNB transmits assistance data including antenna geometry and/or antenna polarisation for PRS transmission to LMF 905 — LMF transmits assistance data including antenna geometry and/or antenna polarisation for PRS transmission to UE 906 — UE estimates LoS based on e.g. polarisation 907 — UE estimates AoA 908 — UE estimates orientation based on polarisation 909 — UE estimates position

1101 — Receive PRS

1102 — Identify orientation of PRS

1103 — Estimate client orientation

1104 — Provide orientation

1200

1201 — Transmit request

1202 — Transmit PRS

1203 — Obtain assistance data

1204 — Receive orientation

CLIENT DEVICE ORIENTATION ESTIMATION

RELATED APPLICATION

This application was originally filed as PCT Application No. PCT/EP2021/061234 on Apr. 29, 2021, which is incorporated herein by reference in its entirety.

TECHNICAL FIELD

The present application generally relates to the field of wireless communications. In particular, the present application relates to a client device for wireless communication, a network node device, and related methods and computer programs.

BACKGROUND

Determining client device orientation is a problem which is partially independent from client device positioning in the sense that knowing the position of a client device does not necessarily provide any information on the orientation of the client device, and vice versa. Positioning methods focus exclusively on obtaining the position of the client device with some level of accuracy, yet they do not provide any orientation information. As a result, the client device orientation can only be estimated via radio access technology independent methods, such as inertia measurement units or other similar sensors. Such solutions, however, are not related to the network operation. Thus, network infrastructure products cannot currently provide a solution for obtaining client device orientation.

SUMMARY

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

An example embodiment of a client device comprises at least one processor and at least one memory comprising computer program code. The at least one memory and the computer program code are configured to, with the at least one processor, cause the client device to: receive a first positioning reference signal; identify an orientation of a polarisation of the first positioning reference signal based on the received first positioning reference signal; estimate an orientation of the client device based on at least the identified orientation of the polarisation of the first positioning reference signal; and provide the orientation estimate to a network node device. The client device can, for example, estimate the orientation of the client device without additional signalling.

An example embodiment of a client device comprises means for performing: receive a first positioning reference signal; identify an orientation of a polarisation of the first positioning reference signal based on the received first positioning reference signal; estimate an orientation of the client device based on at least the identified orientation of the polarisation of the first positioning reference signal; and provide the orientation estimate to a network node device.

In an example embodiment, alternatively or in addition to the above-described example embodiments, the at least one memory and the computer program code are further configured to, with the at least one processor, cause the client device to: obtain assistance data, wherein the assistance data comprises information about the first positioning reference signal; and estimate the orientation of the client device based on at least the identified orientation of the polarisation of the first positioning reference signal and the assistance data. The client device can, for example, efficiently estimate the orientation of the client using the reference signal and the assistance data.

In an example embodiment, alternatively or in addition to the above-described example embodiments, the assistance data comprises at least one of: angle of departure of the first positioning reference signal; antenna geometry used for transmission of the first positioning reference signal; or antenna polarisation used for transmission of the first positioning reference signal. The client device can, for example, efficiently estimate the orientation of the client using the reference signal and the assistance data.

In an example embodiment, alternatively or in addition to the above-described example embodiments, the orientation estimate comprises a relative orientation estimate in relation to identified orientation of the polarisation of the first positioning reference signal. The client device can, for example, efficiently estimate the orientation of the client without the need for additional signalling.

In an example embodiment, alternatively or in addition to the above-described example embodiments, the at least one memory and the computer program code are further configured to, with the at least one processor, cause the client device to perform the identifying the orientation of the polarisation of the first positioning reference signal and/or the estimating the orientation of the client device in response to receiving a request for orientation estimation. The client device can, for example, provide the orientation estimate when the estimate is needed by the network.

In an example embodiment, alternatively or in addition to the above-described example embodiments, the at least one memory and the computer program code are further configured to, with the at least one processor, cause the client device to: receive a second positioning reference signal; identify an orientation of a polarisation of the second positioning reference signal based on the received second positioning reference signal; and estimate an orientation of the client device based on at least the identified orientations of the polarisations of the first positioning reference signal and of the second positioning reference signal. The client device can, for example, efficiently estimate the orientation of the client in three dimensions based on the information provided by the two reference signals.

In an example embodiment, alternatively or in addition to the above-described example embodiments, the first positioning reference signal and/or the second positioning reference signal is transmitted by a first network node device and the second positioning reference signal is transmitted by a second network node device. The client device can, for example, efficiently estimate the orientation of the client in three dimensions based on the information provided by the two reference signals from different network node devices.

In an example embodiment, alternatively or in addition to the above-described example embodiments, the at least one memory and the computer program code are further configured to, with the at least one processor, cause the client device to receive the first positioning reference signal and/or the second positioning reference signal using the orthogonal dual-polarised antenna. The client device can, for example, efficiently discriminate between different polarisations of the reference signal.

In an example embodiment, alternatively or in addition to the above-described example embodiments, the positioning reference signal is received via a line-of-sight path. The client device can, for example, efficiently estimate the orientation of the client based on the reference signal received via a line-of-sight path, since geometry of the path of the reference signal transmission is simplified in the line-of-sight case.

An example embodiment of a network node device comprises at least one processor; and at least one memory including computer program code; the at least one memory and the computer program code configured to, with the at least one processor, cause the network node device to: transmit a request for orientation estimation for a client device; transmit a positioning reference signal to the client device; obtain assistance data wherein the assistance data comprises information about the positioning reference signal; and provide the assistance data to the client device and receive an orientation estimate from the client device; or receive an orientation estimate from the client device and estimate an orientation of the client device based on the assistance data and the received orientation estimate. The network node device can, for example, efficiently obtain an orientation estimate of the client device.

An example embodiment of a network node device comprises means for performing: transmit a request for orientation estimation for a client device; transmit a positioning reference signal to the client device; obtain assistance data wherein the assistance data comprises information about the positioning reference signal; and provide the assistance data to the client device and receive an orientation estimate from the client device; or receive an orientation estimate from the client device and estimate an orientation of the client device based on the assistance data and the received orientation estimate.

In an example embodiment, alternatively or in addition to the above-described example embodiments, the assistance data comprises at least one of: angle of departure of the positioning reference signal; antenna geometry used for the transmission of the positioning reference signal; or antenna polarisation used for the transmission of the positioning reference signal. The network node device can, for example, efficiently obtain the orientation estimate of the client device by providing the assistance data to the client device or by estimating the orientation based on the assistance data and the estimate obtained from the client device.

An example embodiment of a method comprises receiving a first positioning reference signal; identifying an orientation of a polarisation of the first positioning reference signal based on the received first positioning reference signal; estimating an orientation of the client device based on at least the identified orientation of the polarisation of the first positioning reference signal; and providing the orientation estimate to a network node device. The method can, for example, estimate the orientation of the client device without additional signalling.

An example embodiment of a method comprises transmitting a request for orientation estimation for a client device; transmitting a positioning reference signal to the client device; obtaining assistance data wherein the assistance data comprises information about the positioning reference signal; and providing the assistance data to the client device and receiving an orientation estimate from the client device; or receiving an orientation estimate from the client device and estimate an orientation of the client device based on the assistance data and the received orientation estimate. The method can, for example, efficiently obtain an orientation estimate of the client device.

An example embodiment of a computer program product comprises program code configured to perform the method according to any of the above example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings:

FIG. 3 shows an example embodiment of the subject matter described herein illustrating an example system in which various example embodiments of the present disclosure may be implemented;

FIG. 4 shows an example embodiment of the subject matter described herein illustrating aligned and misaligned polarisations;

FIG. 5 shows an example embodiment of the subject matter described herein illustrating positioning reference signal transmission between a network node device and a client device;

FIG. 9 shows an example embodiment of the subject matter described herein illustrating a client device orientation determination procedure;

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
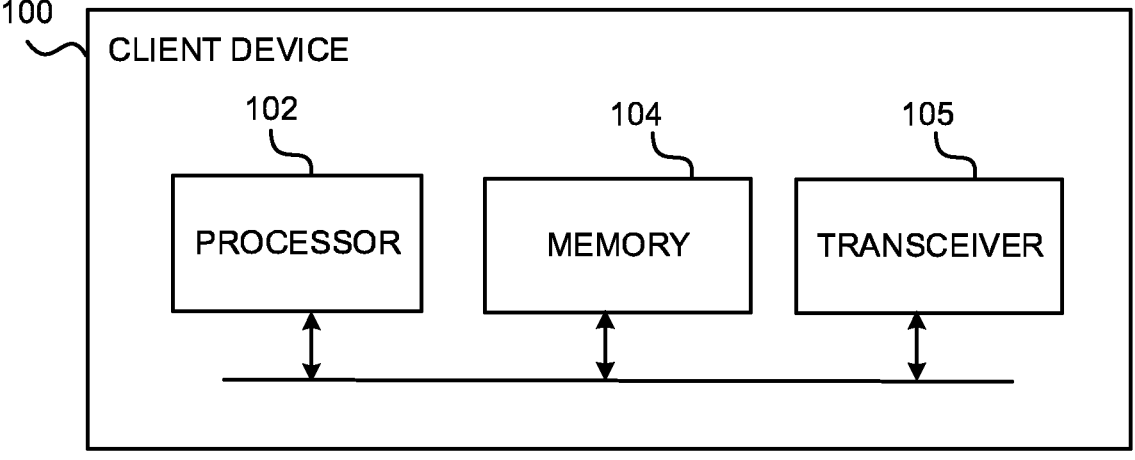
FIG. 1 shows an example embodiment of the subject matter described herein illustrating a client device.

FIG. 1 shows an example embodiment of the subject matter described herein illustrating a client device.

According to an example embodiment, the client device 100 comprises one or more processors 102, and one or more memories 104 that comprise computer program code. The client device 100 may also comprise a transceiver 105, as well as other elements, such as an input/output module (not shown in FIG. 1), and/or a communication interface (not shown in FIG. 1).

According to an example embodiment, the at least one memory 104 and the computer program code are configured to, with the at least one processor 102, cause the client device 100 to receive a first positioning reference signal (PRS).

The first PRS may comprise, for example, a specific reference signal defined by 3GPP or any reference signal used for positioning.

Herein, the first PRS may also be referred to simply as PRS.

The first PRS may be received via a line-of-sight (LOS) path. For example, the PRS may be transmitted over a multipath channel where at least one of the paths may be LOS. The PRS may be transmitted by, for example, a network node device.

The client device 100 may be further configured to identify an orientation of a polarisation of the positioning reference signal based on the received first PRS.

The first PRS may be linearly polarised.

The client device 100 may comprise, for example, an orthogonal dual-polarised antenna. Using such an antenna, the client device 100 can receive the first PRS and identify the orientation of the polarisation of the first PRS in relation to the antenna. Alternatively, the client device 100 may comprise two or more antennas that are orthogonal so that client device 100 can identify the orientation of the polarisation of the first PRS in relation to the two or more antennas.

The client device 100 may be further configured to estimate an orientation of the client device based on at least the identified orientation of the polarisation of the first PRS.

The estimated orientation may be a relative orientation with respect to the polarisation of the first PRS or an absolute orientation in some, for example global, coordinate system. For obtaining an absolute orientation, the client device 100 can utilise other information about the first PRS as disclosed herein. Such information may be referred to as assistance data. The assistance data may be transmitted over, for example, existing interfaces such as LTE Positioning Protocol (LPP) protocol.

The client device 100 may be further configured to provide the orientation estimate to a network node device.

The client device 100 may be configured to, for example, transmit the orientation estimate to a network node device.

If the estimated orientation is an absolute orientation, the network node device may utilise the estimated orientation as such. If the estimated orientation is a relative orientation, the network node device may utilise other available information about the PRS, such as the angle of departure (AoD), in order to deduce the absolute orientation of the client device 100 as disclosed herein.

According to an example embodiment, the client device 100 is configured to perform the identifying the orientation of the polarisation of the PRS and/or the estimating the orientation of the client device in response to receiving a request for orientation estimation.

Although the client device 100 may be depicted to comprise only one processor 102, the client device 100 may comprise more processors. In an example embodiment, the memory 104 is capable of storing instructions, such as an operating system and/or various applications.

Furthermore, the processor 102 is capable of executing the stored instructions. In an example embodiment, the processor 102 may be embodied as a multicore processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 102 may be configured to execute hard-coded functionality. In an example embodiment, the processor 102 is embodied as an executor of software instructions, wherein the instructions may specifically configure the processor 102 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as semiconductor memories (such as mask ROM, PROM (programmable ROM), EPROM (erasable PROM), flash ROM, RAM (random access memory), etc.).

The client device 100 may be any of various types of devices used by an end user entity and capable of communication in a wireless network. Such devices include but are not limited to smartphones, tablet computers, smart watches, laptop computers, Internet-of-Things (IOT) devices, etc. The client device 100 may comprise, for example, a mobile phone, a smartphone, a tablet computer, a smart watch, or any hand-held or portable device or any other apparatus, such as a vehicle, a robot, or a repeater. The client device 100 may also be referred to as a user equipment (UE). The client device 100 may communicate with a network node device via, for example, an air/space born vehicle communication connection, such as a service link.

Some terminology used herein may follow the naming scheme of 4G or 5G technology in its current form. However, this terminology should not be considered limiting, and the terminology may change over time. Thus, the following discussion regarding any example embodiment may also apply to other technologies, such as 6G.

Client device orientation may be important in, for example, indoor factories, where the client device may be embodied in an autonomous or semi-autonomous vehicle.

Figure 2:
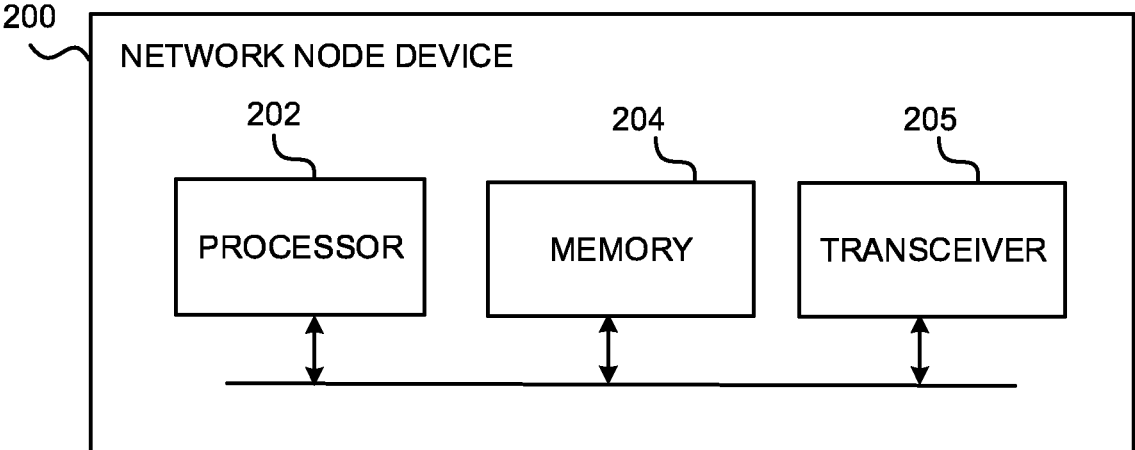
FIG. 2 shows an example embodiment of the subject matter described herein illustrating a network node device.

FIG. 2 shows an example embodiment of the subject matter described herein illustrating a network node device.

According to an example embodiment, the network node device 200 comprises one or more processors 202, and one or more memories 204 that comprise computer program code. The network node device 200 may also comprise a transceiver 205, as well as other elements, such as an input/output module (not shown in FIG. 2), and/or a communication interface (not shown in FIG. 2).

According to an example embodiment, the at least one memory 204 and the computer program code are configured to, with the at least one processor 202, cause the network node device 200 to transmit a request for orientation estimation for a client device.

The network node device 200 may transmit the request to the client device 100.

The network node device 200 may be further configured to transmit a PRS to the client device.

The network node device 200 may be further configured to obtain assistance data wherein the assistance data comprises information about the PRS.

The assistance data may comprise any information about the PRS, such as about the geometry of the PRS. Such information may comprise, for example, angle of departure of the PRS, antenna geometry used for transmission of the PRS and/or antenna polarisation used for transmission of the PRS.

The network node device 200 may be further configured to provide the assistance data to the client device and receive an orientation estimate from the client device or receive an orientation estimate from the client device and estimate an orientation of the client device based on the assistance data and the received orientation estimate.

The network node device 200 may transmit the assistance data to the client device 100 so that the client device 100 can estimate an absolute orientation of the client device 100 using the PRS and the assistance data. Alternatively, the network node device 200 may receive a relative orientation of the client device 100 from the client device 100 and the network node device 200 can then estimate the absolute orientation of the client device 100 using the relative orientation estimate and the assistance data.

Any disclosure herein in relation to the client device 100 may apply also to the network node device 200 unless otherwise indicated. Further, any operations performed by the client device 100 to the at least one downlink signal or any data/signal derived thereof may be also performed by the network node device 200 to the at least one uplink signal or any data/signal derived thereof.

Although the network node device 200 is depicted to comprise only one processor 202, the network node device 200 may comprise more processors. In an example embodiment, the memory 204 is capable of storing instructions, such as an operating system and/or various applications.

Furthermore, the processor 202 is capable of executing the stored instructions. In an example embodiment, the processor 202 may be embodied as a multicore processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 202 may be configured to execute hard-coded functionality. In an example embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may be a base station. The base station may comprise, for example, a fifth-generation base station (gNB) or any such device providing an air interface for client devices 200 to connect to the wireless network via wireless transmissions. In some example embodiments, the network node device 200 may correspond to some other node in the network, such as a location management function.

Further features of the network node device 200 directly result from the functionalities and parameters of the client device 100.

FIG. 3 shows an example embodiment of the subject matter described herein illustrating an example system in which various example embodiments of the present disclosure may be implemented.

The client device 100 and/or the network node device 200 can be utilised in, for example, autonomous or semi-autonomous operation of vehicles. There are numerous automated operations anticipated for industrial applications. A big part of such applications associates to autonomous or semi-autonomous operation of vehicles, referred to as automated guided vehicles (AGVs). AGVs such as (lifting) trucks are typically installed with hoisting device which has its own dimensions and manoeuvrability. This requires that the position of AGVs is obtained with high accuracy as well as in (relatively) real time.

Besides positioning, many applications require that the orientation of such AGVs is also obtained with high accuracy and low latency, such that certain operations are successfully performed. Examples of such orientation-sensitive applications are loading/unloading of goods to/from mobile automated forklifts or trucks, where the "facing" of the mobile device plays a vital role in the flawless loading or unloading of goods.

In the example embodiment of FIG. 3, a client device 100 is embodied in an AGV. The client device 100 can receive a PRS from each network node device 200 in a plurality of network node devices. The network node device 200 can communicate with a location management function (LMF) 301 in order to manage the orientation and/or location estimation of the client device 100.

FIG. 4 shows an example embodiment of the subject matter described herein illustrating aligned and misaligned polarisations.

Downlink (DL) multiple-input and multiple-output (MiMo) performance for mmWave frequency ranges (FR2) may be implemented with dual, for example, feed antenna arrays at both the network node device 200 and at the client device 100. The reasoning behind this approach is to achieve high and similar antenna gain performance in both MiMo channels, while maintaining a compact spatial antenna design. The decorrelation at the antenna arrays can be obtained by ensuring that each antenna feed corresponds to a single polarisation and that the resulting dual feed polarisations are designed to be orthogonal, i.e. designing the antenna array with high cross polarisation discrimination (XPD) feed points. This approach can ensure full utilization of the two MiMo channels for LoS operation provided that the maximum gain direction and the orientation of the orthogonal polarisations are aligned between the two antenna arrays.

In FIG. 4, two polarisation cases are illustrated. In the aligned case, the polarisations 401, 402 are aligned, while in the misaligned case, the polarisations 401, 403 are misaligned. The aligned case in FIG. 4 results in a high XPD while the misaligned case in FIG. 4 results in a low XPD.

Furthermore, the high antenna gain requirements for FR2 frequencies can reduce the antenna radiation beam width, whereby beam steering at the antenna array may be required to cover the needed angular space. The beam steering capabilities can be implemented using tuneable phase shifters at each element in the antenna array, whereby the beam can be controlled electrically (phased array) instead of mechanically. The XPD of any antenna can depend on its radiation pattern and can change dynamically as a function of the Angle of Departure (AoD)/Angle of Arrival (AoA) and this dependency increases as the variations in the radiation pattern changes and as the radiation patterns are changed electrically. Thus, higher antenna gain pattern can results in larger XPD variations, and phase controlled arrays may result in larger XPD variations.

As such, the physical orientation of the antennas can affect the MiMo throughout much more than what is seen at sub 6 GHz frequencies, where the decorrelation at the UE can be achieved by physical separation between two receiving antennas (each with random and different radiation patterns). Instead, the mmW architecture can utilise one dual orthogonally polarised antenna, designed for equal radiation patterns.

The client device 100 can utilise the orientation of the polarisation of the PRS to estimate the orientation of the client device 100 as disclosed herein.

In automated industrial application, for example, the client device 100 may have a larger form factor that allows for well-designed antenna arrays that may not be subject to proximity hand and head mismatches in the field which is otherwise a major issue for the mmWave smart phone application and which can seriously impact beamforming and XPD performance.

FIG. 5 shows an example embodiment of the subject matter described herein illustrating PRS transmission between a network node device and a client device.

The client device 100 can utilise known LOS for the PRS 502 and estimation of the polarisation plane at the client device 100.

Network node device antenna polarisation (vertical (V) and horizontal (H) direction) can be provided to the client device 100 in the assistance data. The solution can enable a two- and three-dimensional orientation estimate at the client device 100. The client device orientation can be obtained based on LOS detection and received PRS polarisation. For example, in the example embodiment of FIG. 5, the client device 100 may estimate the angle 501 of the client device 100 in a global coordinate system.

The client device 100 can implement a low-latency, low-overhead method for obtaining the position and orientation at the client side. This can result in modified signalling with specification impact, as disclosed herein.

The client device 100 can utilise downlink PRS reception and use the received polarisation for estimating the orientation of the client device 100.

The client device can be asked to measure PRS at a given time and frequency.

gNB/LMF can transmit to the client device 100 positioning assistance data. The assistance data may comprise, for example, gNB antenna geometry and polarisation orientation, referring to a global coordinate system.

The client device 100 can estimate the LOS or obtain it from other entity, such as the network, via explicit signalling. This procedure can use preservation of polarisation, geometrical methods or any other methods.

Figure 6:
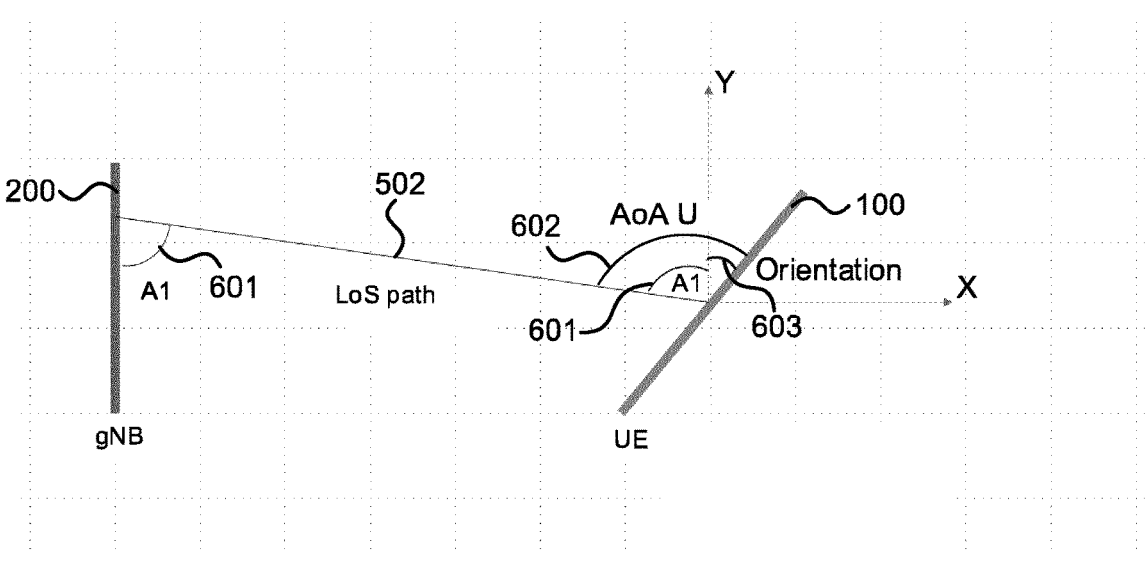
FIG. 6 shows an example embodiment of the subject matter described herein illustrating angles used for client device orientation determination.

FIG. 6 shows an example embodiment of the subject matter described herein illustrating angles used for client device orientation determination.

According to an example embodiment, the client device 100 is further configured to obtain assistance data, wherein the assistance data comprises information about the PRS and estimate the orientation of the client device based on at least the identified orientation of the polarisation of the PRS and the assistance data.

The assistance data may comprise, for example, at least one of: angle of departure of the PRS; antenna geometry used for transmission of the PRS; or antenna polarisation used for transmission of the PRS.

The client device 100 may use, for example, the AoD 601 and the AoA when estimating the client device orientation. The network node device 200 can include the AOD A1 601 in the location assistance data. The client device 100 can then estimate the incoming AoA U 602 based on the PRS.

The client device 100 can estimate, for example, the orientation angle 603 of the client device 100 based on the polarisation of the received PRSs and the information provided in the assistance data.

According to an example embodiment, the orientation estimate comprises a relative orientation estimate in relation to identified orientation of the polarisation of the PRS. Such relative orientation estimate may comprise, for example, the AoA 602.

Figure 7:
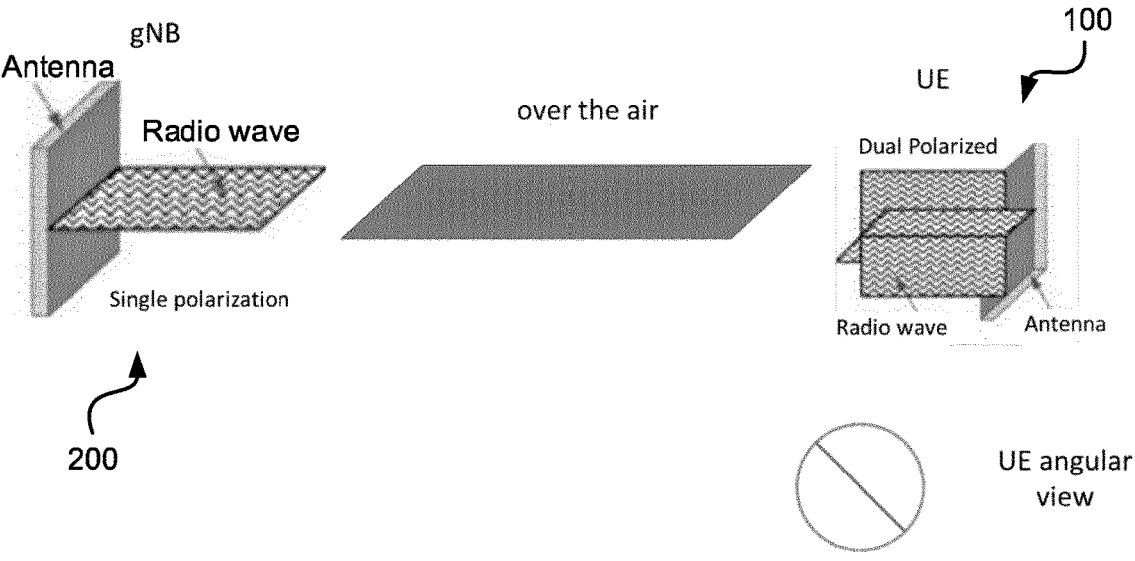
FIG. 7 shows an example embodiment of the subject matter described herein illustrating client device angular view.

FIG. 7 shows an example embodiment of the subject matter described herein illustrating client device angular view.

The example embodiment of FIG. 7 illustrates a client device angular view for a single-polarisation PRS and dual polarised client device reception.

The network node device 200 may be configured to transmit the PRS with a single polarisation, such as linear polarisation. The client device 100 can then receive the PRS using an antenna that can discriminate between two orthogonal polarisation directions.

According to an example embodiment, the client device 100 further comprises an orthogonal dual-polarised antenna, wherein the at least one memory and the computer program code are further configured to, with the at least one processor, cause the client device to receive the PRS using the orthogonal dual-polarised antenna.

Figure 8:
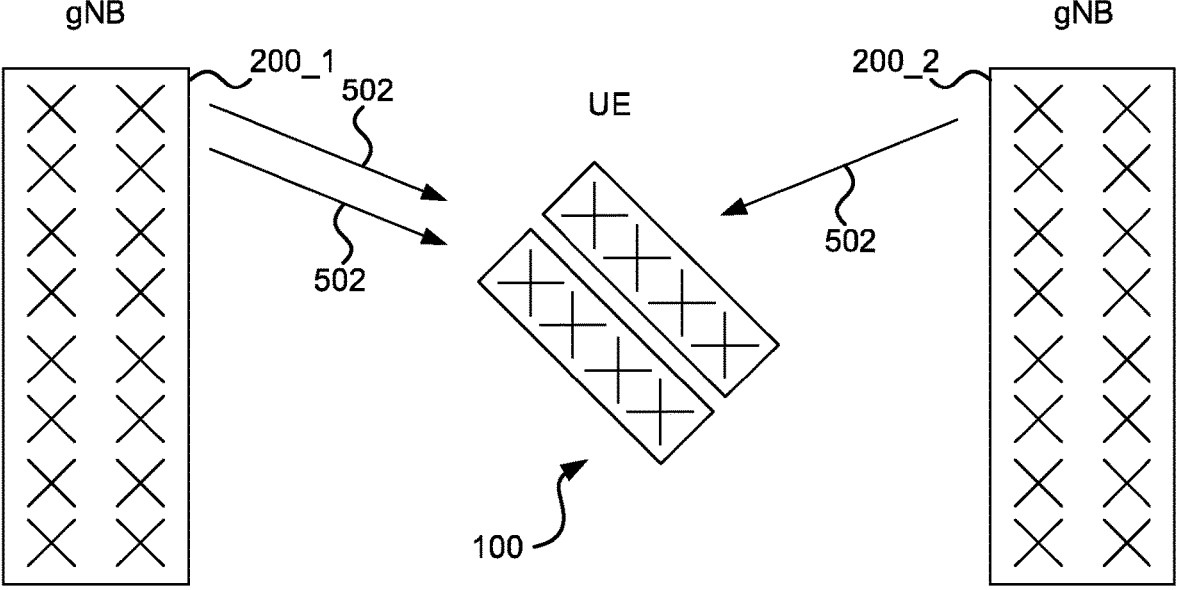
FIG. 8 shows an example embodiment of the subject matter described herein illustrating client device orientation determination using positioning reference signals from two network node devices.

FIG. 8 shows an example embodiment of the subject matter described herein illustrating client device orientation determination using PRSs from two network node devices.

According to an example embodiment, the client device 100 is further configured to receive a second PRS, identify an orientation of a polarisation of the second PRS based on the received second PRS; and estimate an orientation of the client device based on at least the identified orientations of the polarisations of the first PRS and of the second PRS.

According to an example embodiment, the first PRS is transmitted by a first network node device 200_1 and the second PRS is transmitted by a second network node device 200_2.

Receiving PRS from two network node devices 200 can provide additional three-dimensional orientation information from polarisation to the client device 100. Thus, the client device 100 may be able to estimate a three-dimensional orientation of the client device 100. This is illustrated in the example embodiment of FIG. 8.

FIG. 9 shows an example embodiment of the subject matter described herein illustrating a client device orientation determination procedure.

In operation 901, the client device 100 or LMF 301 can initiate a positioning estimate. This may comprise a request to include client device orientation estimation.

In operation 902, the LMF can configure the serving network node device 200, the neighbour network node device 200 and the client device 100 for PRS transmission and measurement.

In operation 903, the network node devices 200 can estimate the PRS AoD.

In operation 904, network node devices 200 can transmit the assistance data to the LMF 301 for example over NR Positioning Protocol A (NRPPa) including, for example at least one of: AoD for the PRS reference signal, antenna geometry of the transmitting PRS antenna, and/or the antenna polarisation used for the PRS transmission.

In operation 905, the LMF 301 can transmit the assistance data to the client device 100 for example over LPP including, for example at least one of: DL AOD for the PRS reference signal, antenna geometry of the transmitting PRS antenna, and/or the antenna polarisation used for the PRS transmission.

In operation 906, the client device 100 can estimate the LOS path for each PRS from each network node device 200. The client device 100 may explore multiple solution based on, for example, polarisation preservation or other mechanisms.

In operation 907, the client device 100 can estimate the received PRS DL AoA.

In operation 908, the client device 100 can estimate received polarisation and estimates the orientation based on the estimated PRS polarisation and, optionally, the received assistance data.

In operation 909, the client device 100 can estimate its position based on the typical DL procedures.

In some example embodiments, the network, such as the network node device 200, can perform the client device orientation estimation. In such embodiments, the assistance data may not be transmitted to the client device 100. The client device 100 can then assume each polarisation (V or H) and compute the orientation as if the polarisation was each of those options. Thus, the client device 100 can estimate the client device orientation in relation to the polarisation of the received signal without estimating the absolute orientation of the client device 100.

The client device 100 can then report the computed values to, for example, the LMF which then by knowing the true PRS transmission polarisation knows the true orientation.

Such example embodiments can be useful to prevent orientation spoofing from the client side and can provide another layer of network integrity checking. The signalling overhead can be roughly equal to the other example embodiments as less assistance data may be required.

Figure 10:
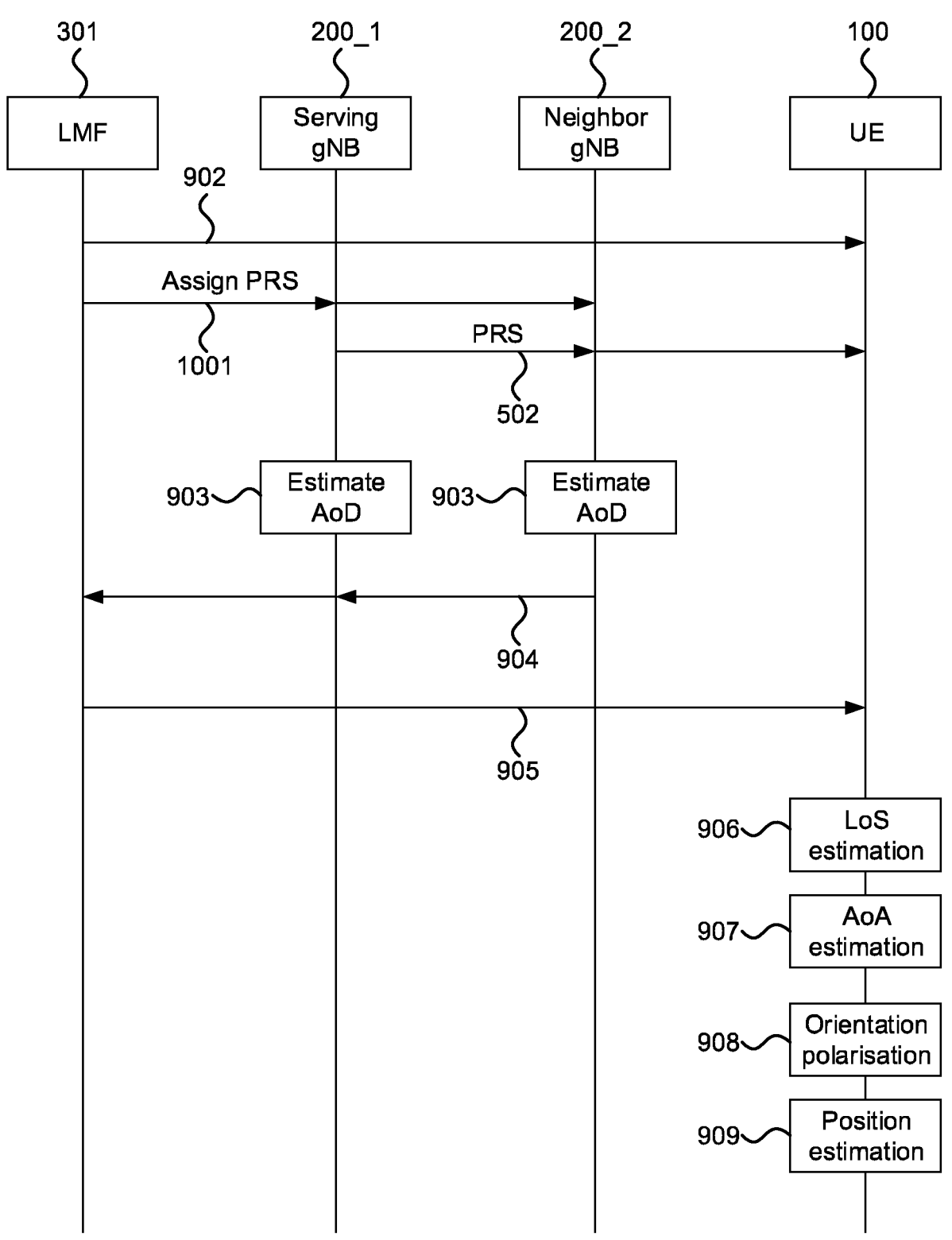
FIG. 10 shows an example embodiment of the subject matter described herein illustrating a signalling diagram.

FIG. 10 shows an example embodiment of the subject matter described herein illustrating a signalling diagram.

Operations discussed above in relation to the example embodiment of FIG. 9 may also apply to the example embodiment of FIG. 10.

After configuring 902 the PRS detection, the LMF 301 can assign PRS 1001.

The serving network node device 200_1 and/or the neighbour network node device 200_2 can transmit the PRS 502 to the client device 100.

Figures 11, 12:
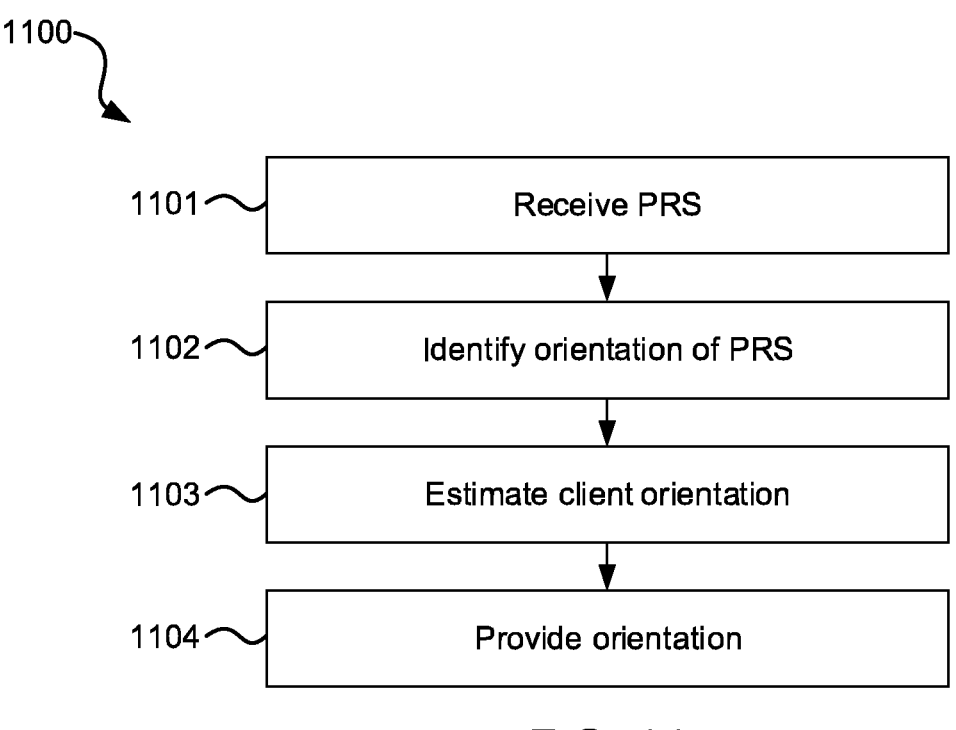
FIG. 11 shows an example embodiment of the subject matter described herein illustrating a method.
FIG. 12 shows an example embodiment of the subject matter described herein illustrating another method.

FIG. 11 shows an example embodiment of the subject matter described herein illustrating a method 1100.

According to an example embodiment, the method 1100 comprises receiving 1101 a PRS.

The method 1100 may further comprise identifying 1102 an orientation of a polarisation of the PRS based on the received PRS.

The method 1100 may further comprise estimating 1103 an orientation of a client device based on at least the identified orientation of the polarisation of the PRS.

The method 1100 may further comprise providing 1104 the orientation estimate to a network node device.

FIG. 12 shows an example embodiment of the subject matter described herein illustrating another method 1200.

According to an example embodiment, the method 1200 comprises transmitting 1201 a request for orientation estimation for a client device.

The method 1200 may further comprise transmitting 1202 a PRS to the client device.

The method 1200 may further comprise obtaining 1203 assistance data wherein the assistance data comprises information about the PRS.

The method 1200 may further comprise providing the assistance data to the client device and receiving 1204 an orientation estimate from the client device; or receiving 1204 an orientation estimate from the client device and estimate an orientation of the client device based on the assistance data and the received orientation estimate.

It is to be understood that the order in which operations 1101-1104 and 1201-1204 are performed, may vary from the example embodiment depicted in FIG. 11 and FIG. 12.

The method 1100 may be performed by the client device 100 of FIG. 1. The method 1200 may be performed by the network node device 200 of FIG. 2. Further features of the methods 1100, 1200 directly result from the functionalities and parameters of the client device 100 and of the network node device 200. The methods 1100, 1200 can be performed, at least partially, by computer program(s).

An apparatus may comprise means for performing any aspect of the method (s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the client device 100 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), Systemon-a-chip systems (SOCs), Complex Programmable Logic Devices (CPLDs), and Graphics Processing Units (GPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. An apparatus comprising at least one processor, and at least one memory including computer program code, the at least one memory and the computer program code configured to, with the at least one processor, cause the apparatus to:
   receive a first positioning reference signal;
   identify an orientation of a polarisation of the first positioning reference signal based on the received first positioning reference signal;
   estimate an orientation of the apparatus based on at least the identified orientation of the polarisation of the first positioning reference signal; and
   provide the orientation estimate to a network node device,
   wherein the at least one memory and the computer program code are further configured to, with the at least one processor, cause the apparatus to:
   receive a second positioning reference signal;
   identify an orientation of a polarisation of the second positioning reference signal based on the received second positioning reference signal; and
   estimate an orientation of the apparatus based on at least the identified orientations of the polarisations of the first positioning reference signal and of the second positioning reference signal.

2. The apparatus according to claim 1, wherein the at least one memory and the computer program code are further configured to, with the at least one processor, cause the apparatus to:

obtain assistance data, wherein the assistance data comprises information about the first positioning reference signal; and
   estimate the orientation of the apparatus based on at least the identified orientation of the polarisation of the first positioning reference signal and the assistance data.

3. The apparatus according to claim 2, wherein the assistance data comprises at least one of:
   angle of departure of the positioning reference signal;
   antenna geometry used for transmission of the first positioning reference signal; or
   antenna polarisation used for transmission of the first positioning reference signal.

4. The apparatus according to claim 1, wherein the orientation estimate comprises a relative orientation estimate in relation to the identified orientation of the polarisation of the first positioning reference signal.

5. The apparatus according to claim 1, wherein the at least one memory and the computer program code are further configured to, with the at least one processor, cause the apparatus to:
   perform the identifying the orientation of the polarisation of the first positioning reference signal and/or the estimating the orientation of the apparatus in response to receiving a request for orientation estimation.

6. The apparatus according to claim 1, wherein the first positioning reference signal is transmitted by a first network node device, and the second positioning reference signal is transmitted by a second network node device.

7. The apparatus according to claim 1, wherein the at least one memory and the computer program code are further configured to, with the at least one processor, cause the apparatus to:
   receive the first positioning reference signal and/or the second positioning reference signal using an orthogonal dual-polarised antenna.

8. The apparatus according to claim 1, wherein the first positioning reference signal and/or the second positioning reference signal is received via a line-of-sight path.

9. A method comprising:
   receiving a first positioning reference signal;
   identifying an orientation of a polarisation of the first positioning reference signal based on the received first positioning reference signal;
   estimating an orientation of a client device based on at least the identified orientation of the polarisation of the first positioning reference signal; and
   providing the orientation estimate to a network node device,
   further comprising:
   receiving a second positioning reference signal;
   identifying an orientation of a polarisation of the second positioning reference signal based on the received second positioning reference signal; and
   estimating an orientation of the client device based on at least the identified orientations of the polarisations of the first positioning reference signal and of the second positioning reference signal.

10. The method according to claim 9, further comprising:
   obtaining assistance data, wherein the assistance data comprises information about the first positioning reference signal; and
   estimating the orientation of the client device based on at least the identified orientation of the polarisation of the first positioning reference signal and the assistance data.

11. The method according to claim 10, wherein the assistance data comprises at least one of:

angle of departure of the positioning reference signal;

antenna geometry used for transmission of the first positioning reference signal; or antenna polarisation used for transmission of the first positioning reference signal.

12. The method according to claim 9, wherein the orientation estimate comprises a relative orientation estimate in relation to the identified orientation of the polarisation of the first positioning reference signal.

13. The method according to claim 9, further comprising:

performing the identifying the orientation of the polarisation of the first positioning reference signal and/or the estimating the orientation of the apparatus in response to receiving a request for orientation estimation.

14. The method according to claim 9, wherein the first positioning reference signal is transmitted by a first network node device, and the second positioning reference signal is transmitted by a second network node device.

15. The method according to claim 9, further comprising:

receiving the first positioning reference signal and/or the second positioning reference signal using an orthogonal dual-polarised antenna.

16. The method according to claim 9, wherein the first positioning reference signal and/or the second positioning reference signal is received via a line-of-sight path.

\* \* \* \* \*